Figure 1:
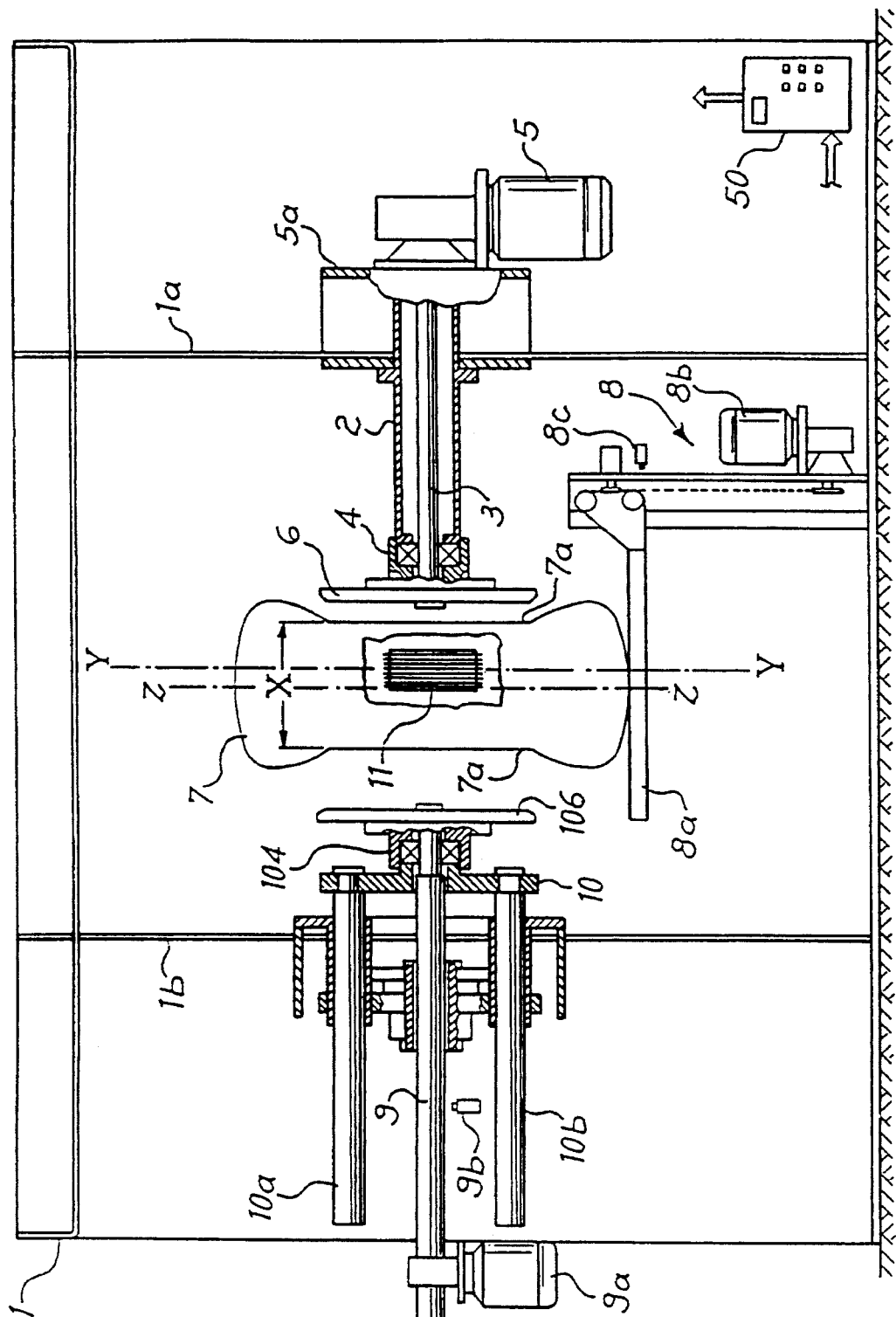

United States Patent [19]

Marangoni

[11] Patent Number: 5,466,182
[45] Date of Patent: Nov. 14, 1995

[54] MACHINE FOR SCRAPING TIRES WITH CONTROLLABLE RELATIVE POSITIONING OF TIRE AND WORK TOOL

[75] Inventor: Giorgio Marangoni, Rovereto, Italy

[73] Assignee: Margangoni Meccanica S.p.A., Italy

[21] Appl. No.: 241,497

[22] Filed: May 12, 1994

[30] Foreign Application Priority Data

May 21, 1993 [IT] Italy .................. MI93A1059

[51] Int. Cl.$^6$ ..................................... B24B 5/00
[52] U.S. Cl. ........................... 451/254; 451/258
[58] Field of Search ................ 51/106 R, 105 R, 51/104, 237 R; 157/13; 451/254, 246, 258, 398

[56] References Cited

U.S. PATENT DOCUMENTS

| | | | |
|---|---|---|---|
| 2,769,283 | 11/1956 | Brown | 51/106 R |
| 3,290,831 | 12/1966 | Laube | 451/254 |
| 3,473,596 | 10/1969 | Meixner | 451/254 |
| 3,848,368 | 11/1974 | Toshioka et al. | 451/254 |
| 4,016,020 | 4/1977 | Ongaro | 51/106 R |
| 4,041,647 | 8/1977 | Ugo | 451/254 |
| 4,071,979 | 2/1978 | Ugo . | |
| 4,241,300 | 12/1980 | Hayes | 51/106 R |
| 4,669,228 | 6/1987 | Rogers | 51/106 R |
| 5,022,186 | 6/1991 | Rogers, Jr. | 51/106 R |

FOREIGN PATENT DOCUMENTS

| | | | |
|---|---|---|---|
| 1493375 | 9/1966 | France . | |
| 1034011 | 10/1913 | Germany | 51/106 R |

OTHER PUBLICATIONS

Database WPI, Derwent Publications Ltd., London, GB, JP-A-58 001 546, Jan. 1983.
Patent Abstracts of Japan, vol. 14, No. 450, JP-A-21 079 732, Jul. 1990.

Primary Examiner—Bruce M. Kisliuk
Assistant Examiner—Derris H. Banks
Attorney, Agent, or Firm—Ladas & Parry

[57] ABSTRACT

A machine for scraping tires and the like comprising means of handling (6, 106) and actuation (4, 104) of a tire (7) made integral with a frame (1) according to a horizontal axis, constituting the axis of rotation of tire (7) and of a work tool (11), and a device (8) for lifting the tire, one (6) of such means of handling being capable of being operated in rotation but fixed in translation to constitute a fixed zero setting for positioning vertical axis of symmetry (z-z) of tire (7), work tool (11) being capable of moving in a horizontal direction parallel to the axis of rotation of the tire so as to achieve the positioning of their vertical axis of symmetry (y-y) in superposition with axis of symmetry (x-x) of the said tire in relation to width dimension (x) of tire (7) and to fixed reference (6).

8 Claims, 3 Drawing Sheets

# MACHINE FOR SCRAPING TIRES WITH CONTROLLABLE RELATIVE POSITIONING OF TIRE AND WORK TOOL The object of this invention is a machine for scraping tires and the like with the relative positioning of the tire and the work tool being capable of being controlled in relation to a fixed reference. It is known that in the technology of the so-called retreading of tires—that is, the replacement of the old, worn tread with a new tread—it is necessary to perform a preliminary operation to smooth the surface of the said tire before applying the new tread.

There are also known machines capable of performing this operation, commonly known as "scraping", in which provision is made for applying the tire to be processed to a support consisting of two plates driven by mechanical arms the spacing of which corresponds to the thickness of the tire being processed, according to the original geometrical features.

Such machines are usually equipped with devices for centring the tire with respect to an axis of symmetry which also represents the axis of symmetry of the work tool, which is fixed and represents in substance the reference setting for positioning the tire.

In such machines, however, it may happen that positioning of the tire carcass in a central position does not prove correct because centring is obtained by means of pneumatic actuators the stroke of which is determined by the contact with the opposite faces of the tire, which may not be correctly positioned, thus resulting in imperfect processing.

There is therefore posed the technical problem of providing an automatic machine for scraping tire carcasses which will make it possible to achieve centring of the work tool in relation to the axis of symmetry irrespective of the initial setting of the tire in the work zone and in relation to the machine's own absolute, fixed and predetermined reference.

Such results are obtained with the present invention, which provides a machine for scraping tires and the like comprising means for retaining and actuating a tire, which are integral with a frame according to a horizontal axis constituting the axis of rotation of the tire and of a work tool, and a device for lifting the tire; one of such means of handling may be driven in rotation but is fixed in translation to constitute a fixed zero setting for positioning the vertical axis of symmetry (z-z) of the tire, while the other one of such means of handling is idle in rotation but capable of translation according to the horizontal axis of rotation of the tire in order to bring about clamping thereof to enable the work tool to move in a horizontal direction parallel to the axis of rotation of the tire so as to achieve the positioning of their vertical axis of symmetry (y-y) in superposition with the axis of symmetry (x-x) of the said tire in relation to width dimension (x) of the tire and to the fixed reference, there being also provided means of actuation and means for reading the measurement of movement of the means of handling, of the device for lifting the tire and of the work tool, and a system for the control and actuation of positioning and of the phases of processing.

Figure 2:
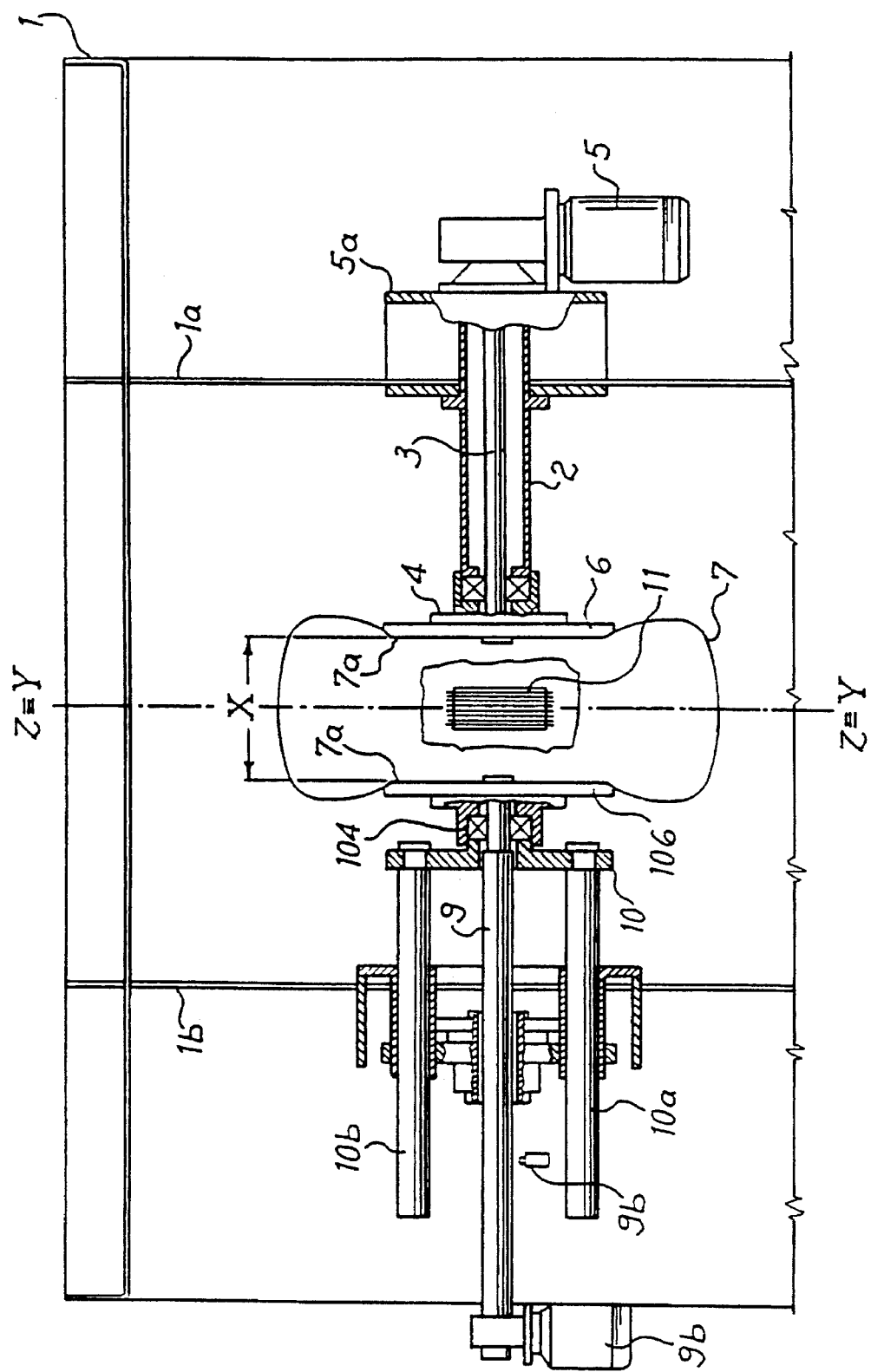

Further details may be obtained from the following description, with reference to the attached drawings, which show:

In FIG. 1: a schematic cross-section of the machine according to the invention, during the loading phase;

In FIG. 2: the machine in FIG. 1 during the processing phase, and

Figure 3:
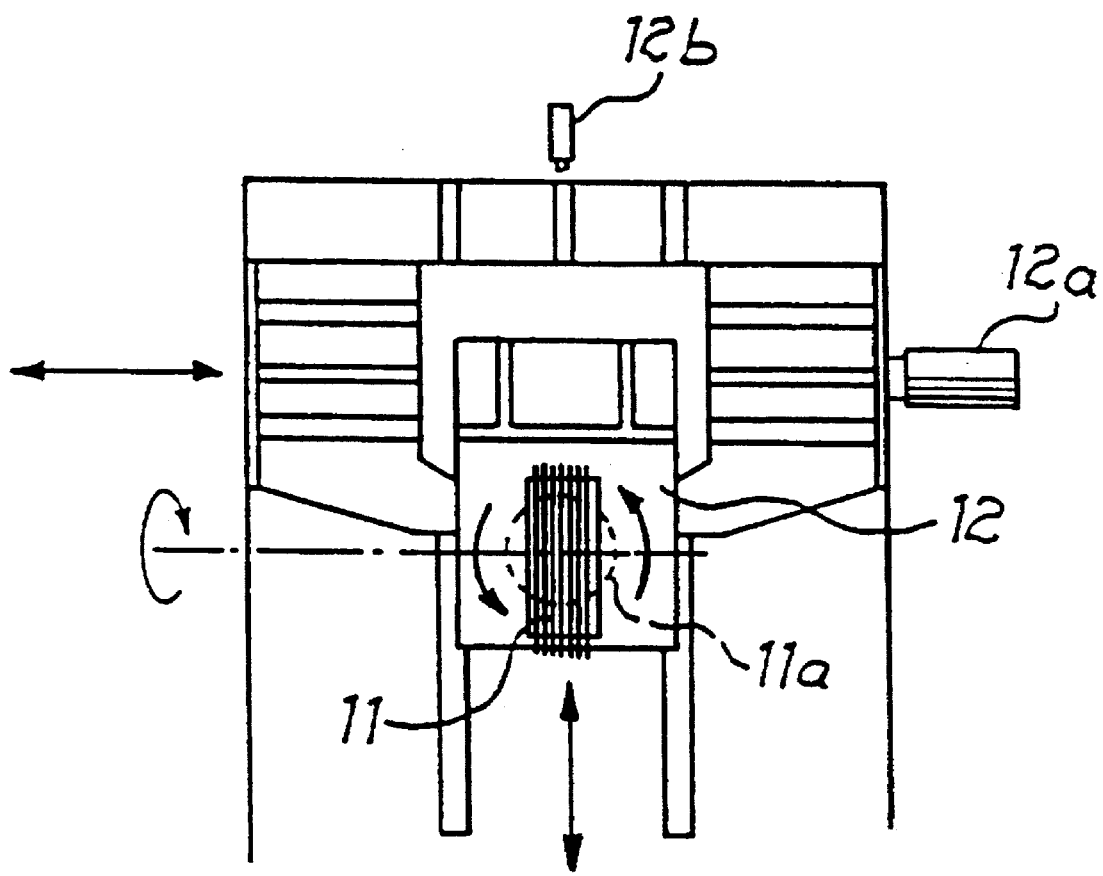
Figure 3:
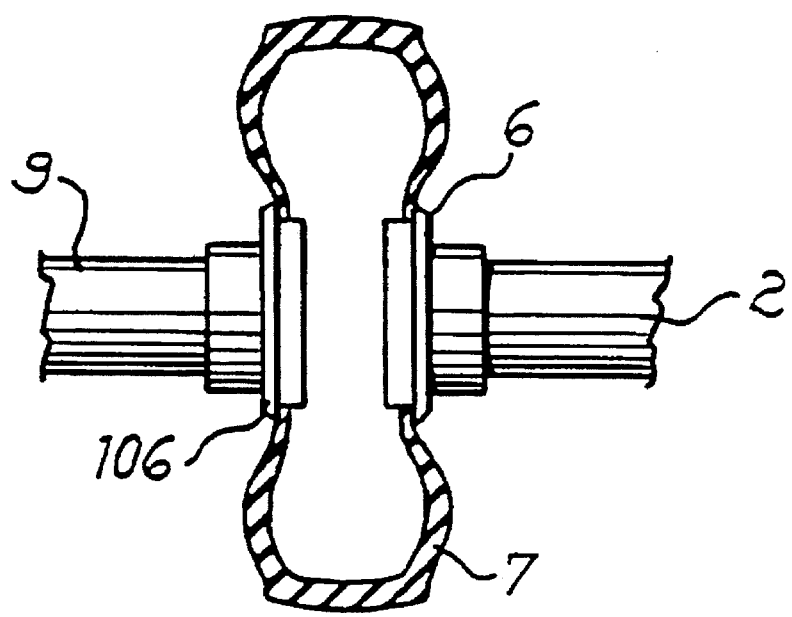

In FIG. 3: a schematic view of the operations performed by the work tool.

As shown in the figures, the machine according to the invention is provided with a frame 1 to which are made integral two shoulders 1a and 1b.

To shoulder 1a is attached a fixed tube 2 in which is inserted a shaft 3 capable of bringing about the rotation of a mandrel 4 upon operation of a motor 5 integral with shoulder 1a via a support 5a.

To the free end of shaft 4 is applied in a known manner a plate 6 engaging tire 7, which is held in position by means of an arm 8a of a lifting device 8 driven by a motor 8b.

On opposite shoulder 1b is mounted like mandrel 104 to which is applied a plate 106 engaging tire 7; such mandrel 104 rotates on bearings 104a keyed to a shaft 9 which is able to move horizontally driven by a motor 9a and with measurement of movement controlled by a reader 9b. In order to maintain a rectilinear stroke such shaft 9 is integral with a plate 10 connected to further guide shafts 10a and 10b.

In the rear position relative to the front loading side of the machine is located the work tool, which is self-evident and therefore only shown schematically at 11.

Such work tool is mounted on a support 12 driven by a motor 12a which brings about movement in a horizontal direction of the said tool, measurement of the movement of the tool being effected by means of a further optical reader 12b which ensures correct positioning of the axis of symmetry of the work tool to the axis of symmetry of the tire, as will become clear from the following.

Tool 11 is also made to rotate by appropriate means 11a around a horizontal axis orthogonal to the axis of rotation of the tire, in order to enable the tangential contact of scraper 11 to be maintained on the tire tread during processing, which is self-evident and therefore not described in detail.

The machine is completed by a digital controller 50 which carries out all the operations of checking and comparison and sends a reference signal to the motors of the moving parts.

The operation of the machine is as follows: tire 7 is identified on the basis of its dimensions, with particular reference to width "X" of the zone corresponding to bead 7a, and is conveyed by lifting device 8 to a position substantially coaxial with that of mandrels 4, 104 and therefore of relevant handling plates 6, 106. At this point, horizontally moving mandrel 104 is made to advance toward fixed mandrel 4 so that the distance from moving plate 106 to fixed plate 6—which represents the fixed point of absolute zero of the system of coordinates of the machine—does not coincide with measurement "X" of the width of the tire, which thus engages facing plates 6, 106 by means of which it is made to rotate.

Simultaneously, measurement "X" corresponding to the width of bead 7a of tire 7 is sent to the controller of scraper 11, which is made to move by its own drive 12a by a quantity X/2 in order to cause its axis of symmetry Y-Y to coincide with axis of symmetry Z-Z of the tire. At this moment the actual scraping operation commences.

As can be seen, the machine according to the invention makes it possible to obtain in an automatic and reliable manner the correct positioning of the scraper with respect to the tire being processed, in keeping with the true measurement of the said tire and with reference to a fixed absolute zero, thus making it possible to avoid positioning errors.

Many variants may be introduced without thereby departing from the scope of the invention in regard to its general features.

I claim:

1. An automated machine for scraping tires, comprising:
a frame;

first means for handling the tire, the first handling means rotatably mounted on the frame and fixed in translation with respect to the horizontal axis of the first handling means, the first handling means thereby defining a reference point;

second means for handling the tire, the second handling means rotatably mounted on the frame and further mounted for horizontal movement along the horizontal axis of the first handling means;

a work tool movably mounted on the frame for movement in a horizontal direction parallel to the horizontal axis of the first handling means;

a tire lifting device for positioning the tire approximately between the first and second handling means;

means for actuating the horizontal movement of the second handling means toward the first handling means so as to position the vertical axis (z-z) of symmetry of the tire to be aligned with respect to the reference point and to secure the tire between the first and second handling means;

means for measuring the movement of the second handling means with respect to the reference point to provide the width dimension (x) of the tire, the measuring means also for measuring the movement of the lifting device;

means for actuating the work tool for positioning the vertical axis (y-y) of the work tool to be aligned with respect to the reference point a distance based on the measured width dimension (x) of the tire;

means for measuring the movement of the work tool; and means for controlling the machine coupled to the measuring means and actuating means whereby the means for actuating the work tool positions the vertical axis of symmetry (y-y) of the work tool in superposition with the vertical axis of symmetry (x-x) of the aligned tire.

2. The automated machine according to claim 1, wherein the means of handling are comprised of a fixed plate and a movable plate respectively integral with the means of actuation.

3. The automated machine according to claim 1, wherein the fixed plate constitutes the zero setting for the positioning of tire and of the work tool.

4. The automated machine according to claim 1, wherein the means of actuation in rotation of tire are substantially comprised of a pair of mandrels respectively mounted on a tube secured to the frame of the machine and on a shaft capable of moving horizontally.

5. The automated machine according to claim 1, wherein the width of the tire is the width corresponding to the position of the beads of the tire.

6. The automated machine according to claim 1, wherein the means for measuring are optical readers.

7. The automated machine according to claim 1, wherein the controlling means is a digital controller.

8. The automated machine according to claim 1, wherein the work tool may rotate around two horizontal axes parallel to one another so as to maintain the tangency between the surfaces in contact with the work tool and with the tire being processed.

* * * * *

UNITED STATES PATENT AND TRADEMARK OFFICE
CERTIFICATE OF CORRECTION

PATENT NO.  : 5,466,182
DATED       : November 14, 1995
INVENTOR(S) : Giorgio MARANGONI It is certified that error appears in the above—identified patent and that said Letters Patent is hereby corrected as shown below:

Title page, Section [73] Assignee:
    delete --Margangoni-- and insert --Marangoni--.

Signed and Sealed this

Twenty-second Day of October, 199

Attest:

BRUCE LEHMAN

Attesting Officer     Commissioner of Patents and Trademarks